(12) United States Patent
Tsujimoto et al.

(10) Patent No.: US 11,720,156 B2
(45) Date of Patent: Aug. 8, 2023

(54) ELECTRONIC DEVICE

(71) Applicant: CANON KABUSHIKI KAISHA, Tokyo (JP)

(72) Inventors: Yuki Tsujimoto, Tokyo (JP); Hiroki Kitanosako, Tokyo (JP); Masashi Yoshida, Miura-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/936,299

(22) Filed: Jul. 22, 2020

(65) Prior Publication Data
US 2021/0034126 A1 Feb. 4, 2021

(30) Foreign Application Priority Data

Jul. 31, 2019 (JP) .................................. 2019-141731

(51) Int. Cl.
| G06F 1/26 | (2006.01) |
| G06F 13/40 | (2006.01) |
| H02J 7/00 | (2006.01) |
| G06F 13/42 | (2006.01) |

(52) U.S. Cl.
CPC .......... *G06F 1/266* (2013.01); *G06F 13/4022* (2013.01); *G06F 13/4282* (2013.01); *H02J 7/0042* (2013.01); *G06F 2213/0042* (2013.01)

(58) Field of Classification Search
CPC ...... H02J 7/00; H02J 7/00045; H02J 2207/40; H02J 7/00034; H02J 7/00036; H02J 7/00047; H02J 7/0027; H02J 7/0042; G06F 1/26; G06F 1/263; G06F 1/266; G06F 13/4022; G06F 13/4282; G06F 2213/0042

USPC .......................... 320/162; 322/318; 713/310
See application file for complete search history.

(56) References Cited

U.S. PATENT DOCUMENTS

| 6,951,019 | B1 * | 9/2005 | Anderson ............. G06F 9/4825 |
| | | | 718/102 |
| 9,158,325 | B1 * | 10/2015 | Lim ......................... G01K 7/16 |
| 10,244,135 | B2 * | 3/2019 | Kondo ............... H04N 1/00888 |
| 10,728,411 | B2 * | 7/2020 | Sakai .................. H04N 1/00907 |
| 10,804,800 | B2 * | 10/2020 | Muto .................... H02M 3/156 |
| 2009/0271645 | A1 * | 10/2009 | Mori ..................... G06F 3/0689 |
| | | | 713/320 |
| 2010/0235652 | A1 * | 9/2010 | Wilson ...................... G06F 1/28 |
| | | | 713/300 |
| 2010/0306565 | A1 * | 12/2010 | Umedu ................... G06F 1/325 |
| | | | 713/300 |

(Continued)

FOREIGN PATENT DOCUMENTS

| JP | 2009-187396 A | 8/2009 |
| JP | 2018-205837 A | 12/2018 |

*Primary Examiner* — Faisal M Zaman
(74) *Attorney, Agent, or Firm* — Canon U.S.A., Inc., IP Division

(57) ABSTRACT

An electronic device includes a connection unit including a first terminal for receiving power from a power supply apparatus and a second terminal for receiving power supply capability of the power supply apparatus, a communication control unit that performs communication with the power supply apparatus via the second terminal, and a power control unit that performs a process for limiting power supplied from the power supply apparatus to a predetermined power or less in a case where the power supply capability is received from the power supply apparatus.

15 Claims, 12 Drawing Sheets

(56) References Cited

U.S. PATENT DOCUMENTS

| | | | |
|---|---|---|---|
| 2014/0136863 A1* | 5/2014 | Fritchman | G06F 1/26 |
| | | | 713/310 |
| 2014/0208134 A1* | 7/2014 | Waters | G06F 13/4282 |
| | | | 713/310 |
| 2014/0331039 A1* | 11/2014 | Akers | G06F 1/3287 |
| | | | 713/2 |
| 2015/0046727 A1* | 2/2015 | Kobayashi | G06F 1/266 |
| | | | 713/300 |
| 2015/0137789 A1* | 5/2015 | Furtner | G06F 1/266 |
| | | | 323/318 |
| 2015/0264208 A1* | 9/2015 | Achiwa | H04N 1/00885 |
| | | | 358/1.15 |
| 2016/0226283 A1* | 8/2016 | Nge | G06F 1/26 |
| 2017/0054310 A1* | 2/2017 | Chen | H02J 7/04 |
| 2017/0075610 A1* | 3/2017 | Choi | G06F 3/0625 |
| 2017/0149325 A1* | 5/2017 | Lau | H02M 3/33507 |
| 2017/0185126 A1* | 6/2017 | Trethewey | H02J 50/80 |
| 2017/0192706 A1* | 7/2017 | Fujimoto | G11C 16/30 |
| 2018/0373289 A1* | 12/2018 | Sultenfuss | H02J 7/00036 |
| 2019/0179685 A1* | 6/2019 | Ki | G06F 12/0253 |
| 2021/0149468 A1* | 5/2021 | Walsh | H02J 1/10 |

* cited by examiner

ELECTRONIC DEVICE

BACKGROUND

Field

Aspects of the disclosure generally relate to an electronic device operable on power from a power supply apparatus and a control method thereof.

Description of the Related Art

Japanese Patent Application Laid-Open No. 2009-187396 discusses an electronic device for receiving power from an external apparatus via a Universal Serial Bus (USB).

Japanese Patent Application Laid-Open No. 2009-187396 does not describe USB Type-C standard and USB Power Delivery (PD) standard, which are newer standards. Devices conforming to the USB PD standard can use a current or voltage higher than the current or voltage specified in the USB Type-C standard.

When an electronic device conforming to the USB, the USB Type-C, and the USB PD standards is connected to a power supply apparatus, the electronic device performs a power supply capability detection process conforming to the USB Type-C standard and a voltage and current determination process conforming to the USB PD standard. The voltage and current determination process conforming to the USB PD standard is performed after completion of the power supply capability detection process conforming to the USB Type-C standard. The voltage and current determination process conforming to the USB PD standard has a limitation that power received from the power supply apparatus needs to be a predetermined power (2.5 W) or less within a predetermined time period (15 ms) if the voltage supplied from the power supply apparatus is not 5 V.

If the electronic device is activated immediately after completion of the power supply capability detection process conforming to the USB Type-C standard, it may not be possible to limit the power received from the power supply apparatus to 2.5 W or less in the voltage and current determination process conforming to the USB PD standard performed after activating the electronic device. If the power received from the power supply apparatus cannot be limited to 2.5 W or less, insufficient power supply can occur in the electronic device before the power supply conforming to the USB PD standard is started. As a result, instantaneous interruption of power supply can possibly occur.

SUMMARY

According to an aspect of the below-described embodiments, received power can be limited before a predetermined time period specified by the Universal Serial Bus Power Delivery (USB PD) standard has elapsed.

According to an aspect of the below-described embodiments, an electronic device includes a connection unit including a first terminal for receiving power from a power supply apparatus and a second terminal for receiving power supply capability of the power supply apparatus, a communication control unit that performs communication with the power supply apparatus via the second terminal, and a power control unit that performs a process for limiting power supplied from the power supply apparatus to a predetermined power or less in a case where the power supply capability is received from the power supply apparatus.

According to another aspect of the below-described embodiments, an electronic device includes a connection unit including a first terminal for receiving power from a power supply apparatus and a second terminal for receiving power supply capability of the power supply apparatus, a communication control unit that performs communication with the power supply apparatus via the second terminal, and a power control unit that controls power supplied from the power supply apparatus, and requests the power supply apparatus to transmit the power supply capability in a case where power supplied from the power supply apparatus is limited to a predetermined power or less.

According to yet another aspect of the below-described embodiments, an electronic device includes a connection unit including a first terminal for receiving power from a power supply apparatus and a second terminal for receiving power supply capability of the power supply apparatus, a communication control unit that performs communication with the power supply apparatus via the second terminal, and a power control unit that performs a process for limiting power supplied from the power supply apparatus to a predetermined power or less in a case where the power supply capability is received from the power supply apparatus when the electronic device is in a power on state.

Additional aspects will become apparent from the following description.

DESCRIPTION OF THE EMBODIMENTS

Exemplary embodiments, features, and aspects of the disclosure will be described below with reference to the drawings. However, aspects of the disclosure are not limited to the following embodiments.

Figure 1:
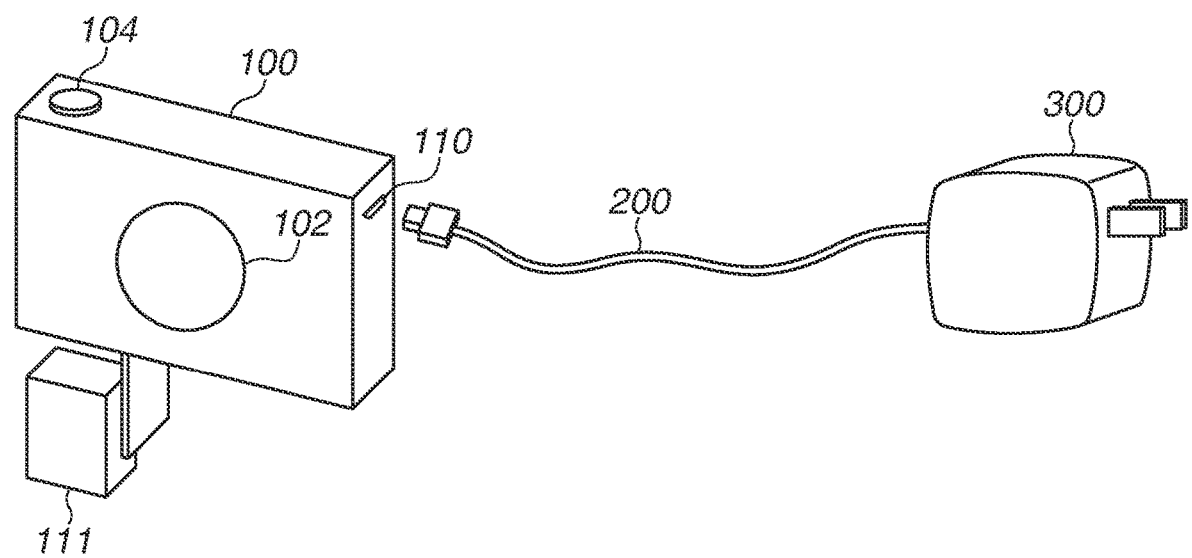
FIG. 1 is a diagram illustrating components of a power supply system.

A first embodiment will be described below. FIG. 1 is a diagram illustrating components of a power supply system according to first, second, and third embodiments. The power supply system includes an electronic device 100, a Universal Serial Bus (USB) Type-C cable 200, and a power supply apparatus 300, as illustrated in FIG. 1. All of the electronic device 100, the USB Type-C cable 200, and the power supply apparatus 300 conform to the USB, the USB Type-C, and the USB Power Delivery (PD) standards.

The electronic device 100 can be a digital camera, smartphone, media player, smart device, or personal computer. The electronic device 100 includes an image capture unit 102, an operation unit 104, and a connection unit 110 (described below). The electronic device 100 operates on power from a removable battery 111. The connection unit 110 is a USB Type-C connector that can receive power supplied from the power supply apparatus 300 via the USB Type-C cable 200.

The power supply apparatus 300 can be an alternating current (AC) adapter or a mobile battery. The electronic device 100 does not operate on the power of the battery 111, but on the power supplied from the power supply apparatus 300. In terms of the VBUS input/output relation, the power supply apparatus 300 serves as a source apparatus, and the electronic device 100 serves as a sink apparatus.

Figure 2:
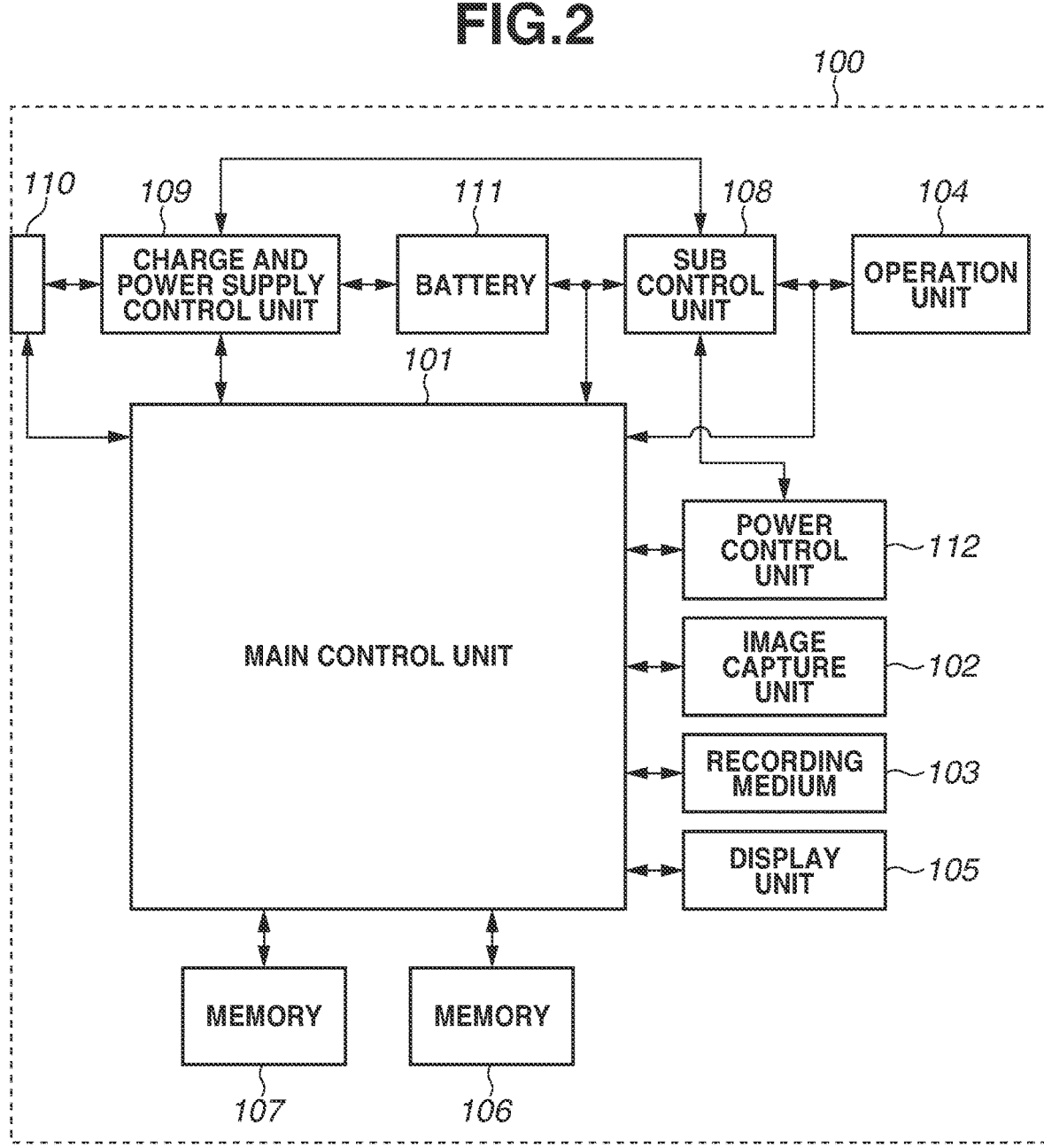
FIG. 2 is a block diagram illustrating a configuration of an electronic device.

Components of the electronic device 100 will be described below with reference FIG. 2.

A main control unit 101 controls components of the electronic device 100 based on a program. Instead of the main control unit 101 controlling the entire electronic device 100, hardware components can share processes to control the entire electronic device 100.

The image capture unit 102 converts subject light formed by a lens included in the image capture unit 102 into an electrical signal, subjects the signal to a noise reduction process, and outputs the resultant digital data as image data. The captured image data is accumulated in a buffer memory, subjected to a predetermined calculation by the main control unit 101, and then recorded in a recording medium 103.

The recording medium 103 can record image data output from the image capture unit 102. The recording medium 103 can be configured to be attachable to and detachable from the electronic device 100 or built into the electronic device 100. For example, the electronic device 100 needs to include at least means for accessing the recording medium 103.

The operation unit 104 is used for receiving an instruction to the electronic device 100 from the user, and transmits a signal to the main control unit 101 or the sub control unit 108. The operation unit 104 includes operation members operated by the user, such as a power button for turning power of the electronic device 100 ON and OFF, a release switch for issuing an image shooting instruction, and a zoom lever for issuing a zoom operation instruction. The operation unit 104 also includes a reproduction button for reproducing image data, a mode dial for specifying the activation mode of the electronic device 100, and a touch panel formed on a display unit 105 (described below). The release switch includes a switch SW1 and a switch SW2. When the release switch is half-pressed, SW1 turns ON. Thus, the main control unit 101 receives instructions for performing image shooting preparations such as an automatic focus (AF) process, an automatic exposure (AE) process, an automatic white balance (AWB) process, and an electronic flash preliminary emission (EF) process. When the release switch is full-pressed, switch SW2 turns ON. Thus, the main control unit 101 receives an image shooting instruction.

The display unit 105 displays the view finder image during image capturing, captured image data, and texts for interactive operations. The display unit 105 does not need to be included in the electronic device 100. The electronic device 100 can be connected to the internal or external display unit 105 and needs to have at least a display control function for controlling the display of the display unit 105.

A memory 106 is used as a buffer memory for temporarily storing image data captured by the image capture unit 102. A memory 107, which is a nonvolatile memory, stores programs to be executed by the main control unit 101.

The sub control unit 108 includes a processor for controlling a part of the electronic device 100, a random access memory (RAM) used as a work area, and a read only memory (ROM) for storing processing procedures. The sub control unit 108 is operable with lower power consumption than the main control unit 101, and is configured to control a charge and power supply control unit 109 (described below). The sub control unit 108 operates as a power control unit and is capable of data communication with the main control unit 101.

The charge and power supply control unit 109 supplies power received from the connection unit 110 to components of the charge and power supply control unit 109. At the same time, the charge and power supply control unit 109 charges the battery 111 by using the power received from the connection unit 110.

The connection unit 110 is an interface for connecting with the power supply apparatus 300. The electronic device 100 can exchange data with the power supply apparatus 300 via the connection unit 110. The electronic device 100 can receive power supply from the power supply apparatus 300 via the connection unit 110. According to the first to the third embodiments, the electronic device 100 operates as a USB device. The connection unit 110 includes an interface connector for communicating with the power supply apparatus 300 via USB, and a USB device controller. The main control unit 101 controls the connection unit 110 to implement USB communication with the power supply apparatus 300 and USB charge.

The battery 111 supplies power necessary to operate the electronic device 100. The battery 111 is configured to be attachable to and detachable from the electronic device 100 and to be charged by receiving power from the connection unit 110 via the charge and power supply control unit 109. The battery 111 includes a central processing unit (CPU) for performing an authentication process, a RAM, and a ROM to implement the authentication process between the main control unit 101 or between the sub control unit 108 of the electronic device 100.

A power control unit 112 controls the supply and interruption of power from the battery 111 or the charge and power supply control unit 109 to the components depending on the state of the electronic device 100. The power control unit 112 is controlled by the main control unit 101 or the sub control unit 108.

Figure 3:
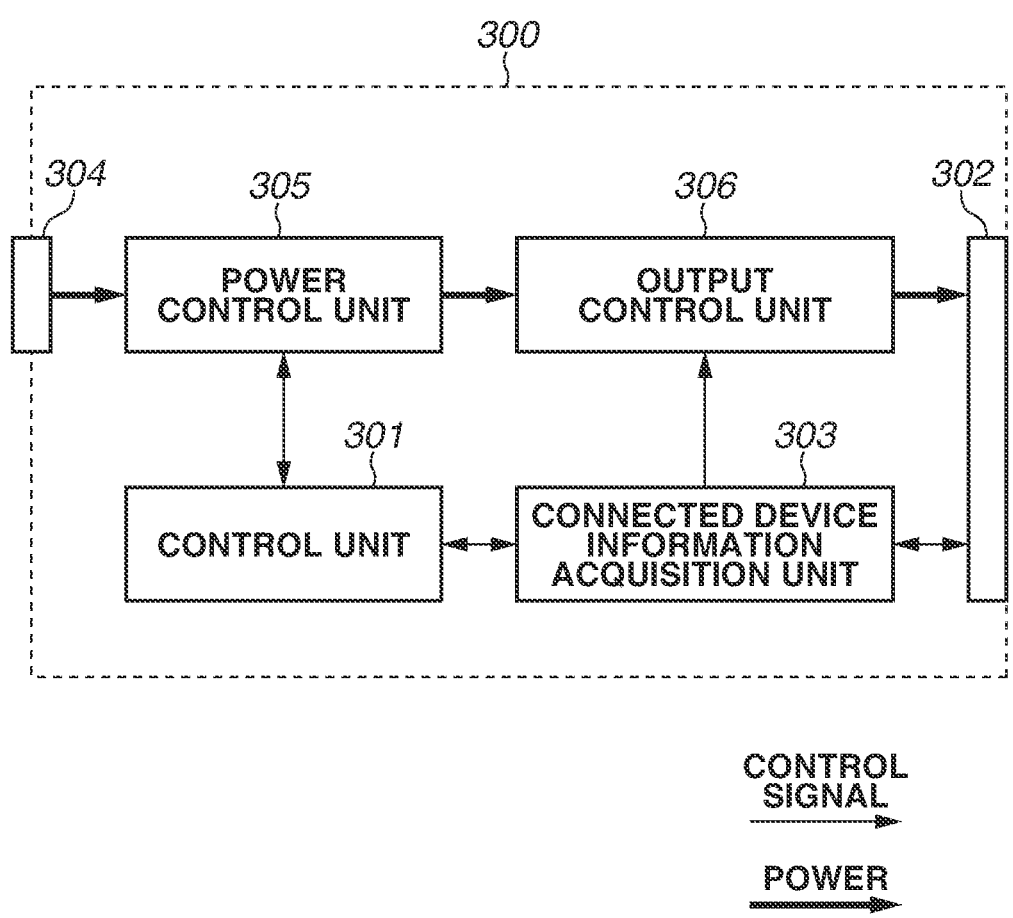
FIG. 3 is a block diagram illustrating a configuration of a power supply apparatus.

Components of the power supply apparatus 300 will be described below with reference to FIG. 3.

A control unit 301 includes a processor for controlling the components of the power supply apparatus 300 and a memory. A connection unit 302 is an interface for connecting with the electronic device 100. In a case where the power supply apparatus 300 is connected with a power supply destination, for example, the electronic device 100, the power supply apparatus 300 can supply power to the electronic device 100.

A connected device information acquisition unit 303 operates as a communication control unit of the power supply apparatus 300. The connected device information acquisition unit 303 can give notification about power supply capability of the connected power supply apparatus 300 based on the voltage of the Configuration Channel (CC) terminal. The connected device information acquisition unit 303 can offer suppliable power to the connected electronic device 100 and negotiate requested power with the electronic device 100 via communication using the CC terminal. Communication via the CC terminal conforms to the USB PD standard.

A connection unit 304 is connected to an external power source such as a commercial power and a mobile battery. The power control unit 305 converts the power obtained from the connection unit 304 to power that can be supplied to the electronic device 100. For example, in a case where the device connected to the connection unit 304 is to supply power from a home power source (100 V/50 Hz AC power source) to the electronic device 100 (9 V/3 A), the power control unit 305 performs AC-to-DC conversion to enable output of 9 V. The output voltage of the power supply apparatus 300 is changed based on an instruction of the control unit 301 by referencing the power supply capability obtained by the connected device information acquisition unit 303. For example, the voltage and current which can be output by the power control unit 305 corresponds to information about the power suppliable by the power supply apparatus 300.

The output control unit 306 is connected to the VBUS terminal of the connection unit 302. The output control unit 306 controls the supply and interruption of the power supplied from the power control unit 305 to the electronic device 100 via the VBUS terminal. The output control unit 306 further controls the output timing via the connected device information acquisition unit 303, receives a stop command from the electronic device 100, and performs a stop process.

Figure 4:
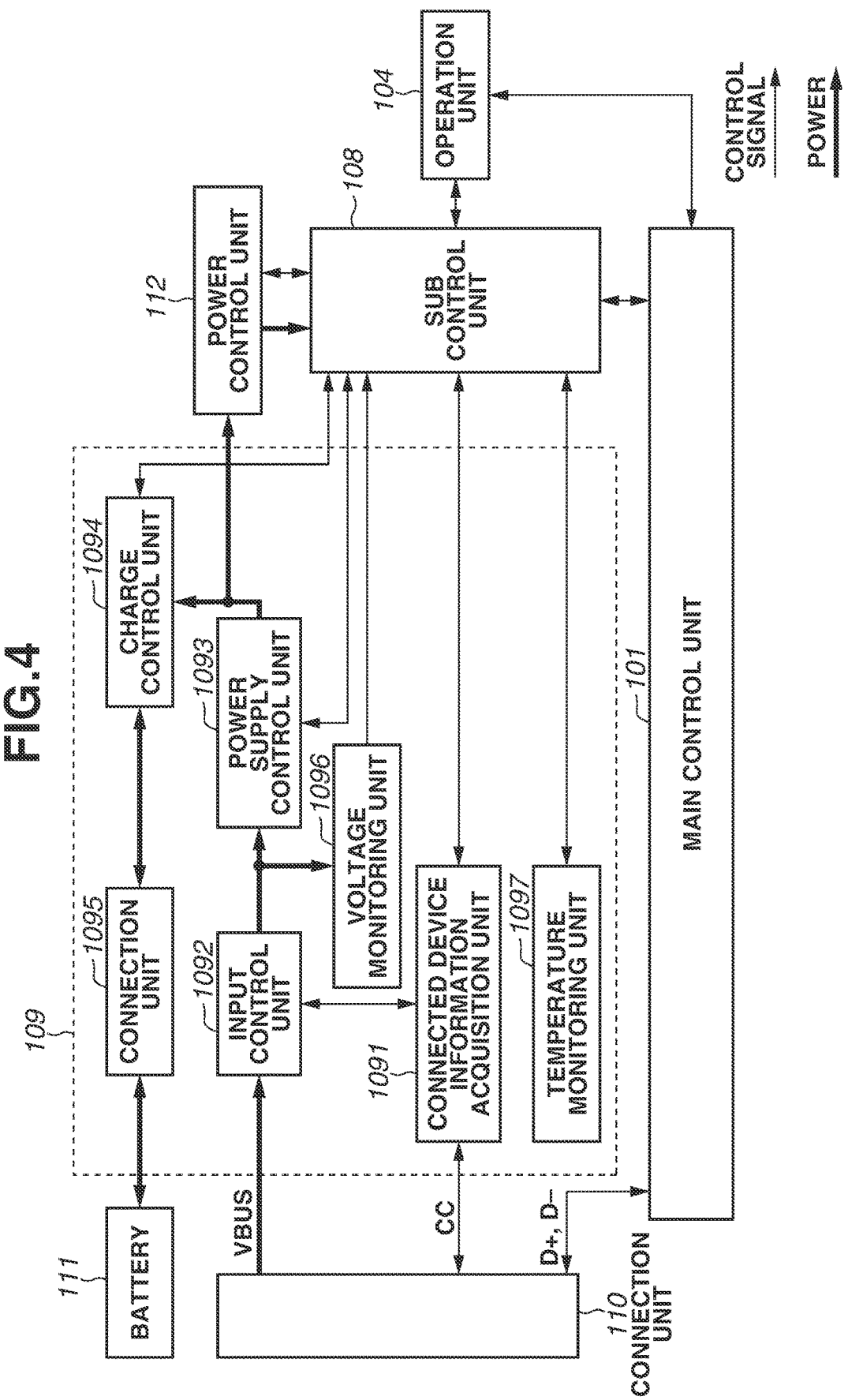
FIG. 4 is a block diagram illustrating components of a charge and power supply control unit illustrated in FIG. 2.

Components of the charge and power supply control unit 109 included in the electronic device 100 will be described below with reference to FIG. 4.

A connected device information acquisition unit 1091 connected to the CC terminal of the connection unit 110 operates as a communication control unit. The connected device information acquisition unit 1091 can detect the power supply capability of the connected power supply apparatus 300 based on the CC terminal voltage. The connected device information acquisition unit 1091 can also negotiate the supplied power with the connected power supply apparatus 300 via communication using the CC terminal.

An input control unit 1092 connects with the VBUS terminal of the connection unit 110. The input control unit 1092 can receive power from the power supply apparatus 300 connected to the VBUS terminal and, based on the result of the connected device information acquisition unit 1091, selects whether to supply power to a power supply control unit 1093.

The power supply control unit 1093 controls the conversion of VBUS power supplied via the input control unit 1092 into a voltage receivable by the power control unit 112 and a charge control unit 1094. The power supply control unit 1093 steps down the 5 V or 9 V voltage to a suitable voltage. For example, in a case where the battery 111 includes one cell, it is fully charged by 4.2 V. If the battery 111 is absent, the power supply control unit 1093 instructs the power control unit 112 to control the conversion of the VBUS power supplied via the input control unit 1092 into a most efficient voltage (e.g., 3.7 V).

Based on an instruction of the sub control unit 108, the power supply control unit 1093 can also limit the suppliable current based on the power supply capability of the power supply apparatus 300 acquired by the connected device information acquisition unit 1091. For example, if the power supply capability of the power supply apparatus 300 is 9 V/3 A, the power supply control unit 1093 steps down 9 V/3 A to a predetermined voltage targeting the battery voltage 4.2 V not to draw current greater than or equal to 3.0 A.

The charge control unit 1094 can charge the battery 111 connected to the connection unit 1095 (described below) by using power received from the VBUS terminal via the input control unit 1092 and the power supply control unit 1093. The charge control unit 1094 controls the current or voltage not to damage the battery 111 to perform CC charge and CV charge.

The connection unit 1095 can connect with the removable battery 111. The connection unit 1095 includes a positive terminal to be connected with the positive terminal of the battery 111, a negative terminal to be connected with the negative terminal of the battery 111, a terminal to be connected with the authentication circuit of the battery 111, and a terminal to be connected with the thermistor of the battery 111.

A voltage monitoring unit 1096 monitors the input VBUS voltage and notifies the sub control unit 108 of the acquired voltage. For example, if the power supply capability of the power supply apparatus 300 is 9 V/3 A, the voltage monitoring unit 1096 monitors whether the power supply apparatus 300 is outputting an unexpected high voltage (e.g., 15 V). Alternatively, the voltage monitoring unit 1096 monitors whether the power supply apparatus 300 is outputting a voltage much lower than 9 V, for example, due to short circuit of the electronic device 100 by an abnormal condition. If necessary, the sub control unit 108 deactivates the input control unit 1092 and then issues a power supply stop instruction to the power supply apparatus 300 via the connected device information acquisition unit 1091.

A temperature monitoring unit 1097 monitors the temperature around the connection unit 110 and notifies the sub control unit 108 of the temperature. If the temperature around the connection unit 110 is a predetermined temperature or higher, the sub control unit 108 deactivates the input control unit 1092 and then issues a power supply stop instruction to the power supply apparatus 300 via the connected device information acquisition unit 1091.

The sub control unit 108 needs to control the power supply control unit 1093 as a power control unit regardless of whether the power supply apparatus 300 is connected. In a case where the power supply apparatus 300 is connected to the connection unit 110, the connected device information acquisition unit 1091, as a communication control unit, needs to control communication with the power supply apparatus 300 via a CC line.

From the viewpoint of power consumption, it is desirable that the sub control unit 108 and the connected device information acquisition unit 1091 are supplied with power when necessary, and therefore that these units are configured to be supplied with power from different power supply sources. For example, the sub control unit 108 can be configured to operate on the power of the battery 111 or the power output from the input control unit 1092 under the control of the connected device information acquisition unit 1091. The connected device information acquisition unit 1091 can be configured to operate on VBUS power received from the power supply apparatus 300. Communication between the sub control unit 108 and the connected device information acquisition unit 1091 can be limited depending on the power-ON timing of the sub control unit 108 and the connected device information acquisition unit 1091.

In a case where the sub control unit 108 operates only as a power control unit, communication between the connected device information acquisition unit 1091 and the sub control unit 108 can be instantaneously performed upon connection between the electronic device 100 and the power supply apparatus 300.

The sub control unit 108 can have different role from the power control unit. While the sub control unit 108 is performing a process other than a process performed by the power control unit, the sub control unit 108 cannot communicate with the connected device information acquisition unit 1091. As a result, in a case where the electronic device 100 is connected with the power supply apparatus 300, it may not be possible to control the power received from the power supply apparatus 300 to predetermined power (2.5 W) or less within the predetermined time period (15 ms) specified in the USB PD standard.

Figure 5:
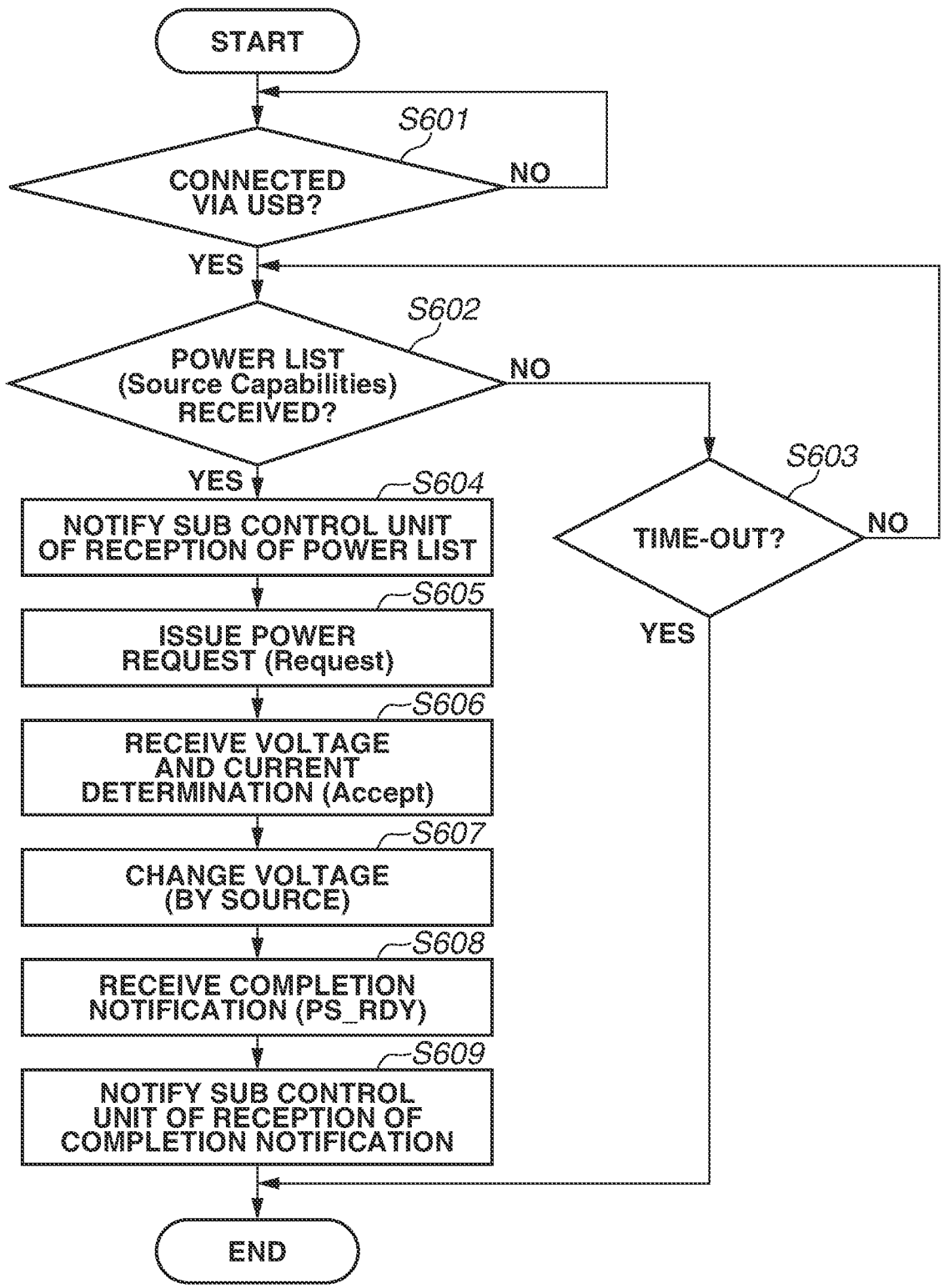
FIG. 5 is a flowchart illustrating processing performed by an electronic device.

Processing performed when the electronic device 100 is connected with the power supply apparatus 300 will be described below with reference to the flowchart illustrated in FIG. 5.

In step S601, the electronic device 100 detects that the power supply apparatus 300 is connected to the connection unit 110. The electronic device 100 can detect the connection based on the VBUS voltage detected via the voltage monitoring unit 1096 or on the voltage level of the CC terminal detected via the connected device information acquisition unit 1091. The processing does not proceed to a subsequent step until the connection is detected.

In step S602, the connected device information acquisition unit 1091 waits for the reception of a power list (Source Capabilities) from the connected device information acquisition unit 303.

In step S603, the connected device information acquisition unit 1091 waits for the reception of a power list (Source Capabilities) until a time-out occurs. According to the first embodiment, for example, in a case where the electronic device 100 does not receive a power list after waiting for 620 ms, the electronic device 100 transmits a reset signal to the connected device information acquisition unit 303 via the connected device information acquisition unit 1091. If the electronic device 100 does not receive a power list after repeating the above-described sequence three times, a time-out occurs. Upon the time-out, the process for connection is terminated.

In a case where the connected device information acquisition unit 1091 receives a power list (Source Capabilities) (YES in step S602), the processing proceeds to step S604. Since the power control unit 305 is capable of supplying 5 V or 9 V, the first embodiment premises that two different power lists (5 V/3 A and 9 V/2 A) are presented. Any one of 5 V, 9 V, 15 V, or 20 V is presented as a list depending on the power supply capability of the power supply apparatus 300.

In step S604, the connected device information acquisition unit 1091 notifies the sub control unit 108 of the reception of a power list (Source Capabilities).

In step S605, the connected device information acquisition unit 1091 issues a power request (Request) to the connected device information acquisition unit 303. The electronic device 100 serving as a sink apparatus requests the power supply apparatus 300 serving as a source apparatus for Power Data Object (PDO) as a power list.

According to the first embodiment, in a case where the electronic device 100 can receive 5 V/3 A or 9 V/2 A from the power supply apparatus 300, the electronic device 100 is operable on the power received from the power supply apparatus 300 alone. PDO initial setting of the connected device information acquisition unit 1091 is set such that only 5 V/1.5 A is requested. If the power supply apparatus 300 can supply power based on the PDO received by the connected device information acquisition unit 303, the power supply apparatus 300 transmits a voltage and current determination (Accept) to the electronic device 100.

In step S606, the connected device information acquisition unit 1091 receives the voltage and current determination (Accept) from the connected device information acquisition unit 303.

In step S607, under the instruction of the control unit 301, the power supply apparatus 300 controls the power control unit 305 to change the output voltage of the power supply apparatus to the voltage indicated by the voltage and current determination (Accept). When the voltage change by the power control unit 305 is completed in step S607, the power supply apparatus 300 transmits a completion notification (PS_RDY) via the connected device information acquisition unit 303.

In step S608, the connected device information acquisition unit 1091 receives a completion notification (PS_RDY) from the connected device information acquisition unit 303.

In step S609, the connected device information acquisition unit 1091 notifies the sub control unit 108 of the reception of a completion notification (PS_RDY). Then, the connection operation conforming to the USB PD standard ends.

Figure 6:
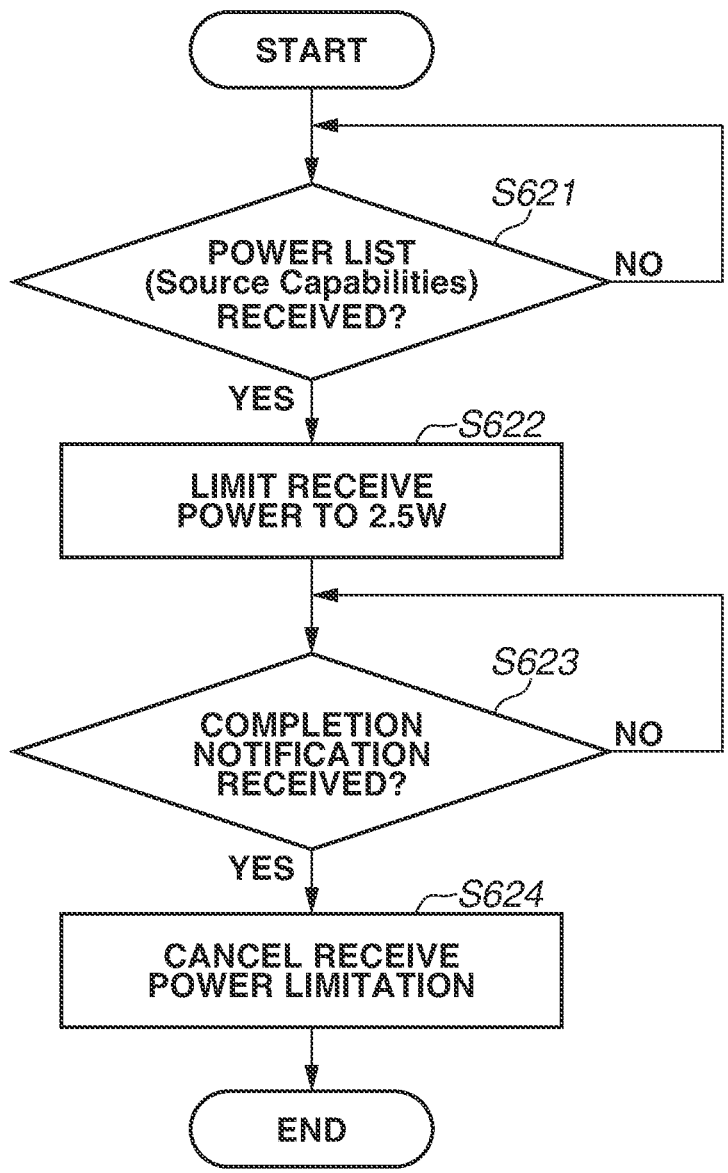
FIG. 6 is a flowchart illustrating processing performed by an electronic device.

Processing performed when the electronic device 100 is connected to the power supply apparatus 300 via the USB Type-C cable 200 will be described below with reference to the flowchart illustrated in FIG. 6. The processing illustrated in FIG. 6 is implemented when the sub control unit 108 of the electronic device 100 controls the connected device information acquisition unit 303 or the power supply control unit 1093 based on a program.

When the sub control unit 108 is activated, then in step S621, the sub control unit 108 waits for a power list (Source Capabilities) reception notification from the connected device information acquisition unit 1091.

In a case where the sub control unit 108 receives a power list (Source Capabilities) reception notification (YES in step S621), the processing proceeds to step S622. In step S622, the sub control unit 108 instructs the power supply control unit 1093 to limit a VBUS current.

According to the first embodiment, since a voltage change to 9 V is assumed, the VBUS limit current needs to be set to approximately 0.277 A or less to provide predetermined power (2.5 W) or less with the 9 V voltage. According to the first embodiment, the VBUS limit current is to be set to 0.1 A or less. As described above, the current value to be limited based on the required voltage is determined by the predetermined power (2.5 W) divided by the required voltage and set to the calculated value or less.

According to the first embodiment, the sub control unit 108 limits the VBUS current by using a power list (Source Capabilities) reception notification as a trigger. If received power can be limited before elapse of 15 ms since the time when the sub control unit 108 receives the voltage and current determination (Accept), the VBUS current can be limited after the connection detection for the power supply apparatus 300 and the issuance of the power request (Request).

According to the first embodiment, the sub control unit 108 limits the VBUS current upon reception of a power list (Source Capabilities) reception notification. As a result of the reception of a power list, if the VBUS voltage is not to be changed, such as in a case where the power supply apparatus 300 can output only 5 V, the sub control unit 108 does not necessarily need to limit the VBUS current.

In step S623, the sub control unit 108 waits for a reception notification for the completion notification (PS_RDY) from the connected device information acquisition unit 1091. When the sub control unit 108 receives a reception notification (YES in step S623), the processing proceeds to S624. In step S624, the sub control unit 108 instructs the power supply control unit 1093 to change the VBUS current limitation based on the PDO under the voltage and current determination (Accept).

According to the first embodiment, the sub control unit 108 instructs the power supply control unit 1093 to change the VBUS current limitation to 3 A (when connected with 5 V) or to 2 A (when connected with 9 V).

When the processing illustrated in FIG. 6 is completed, the sub control unit 108 ends the connection operation conforming to the USB PD standard.

Figure 11:
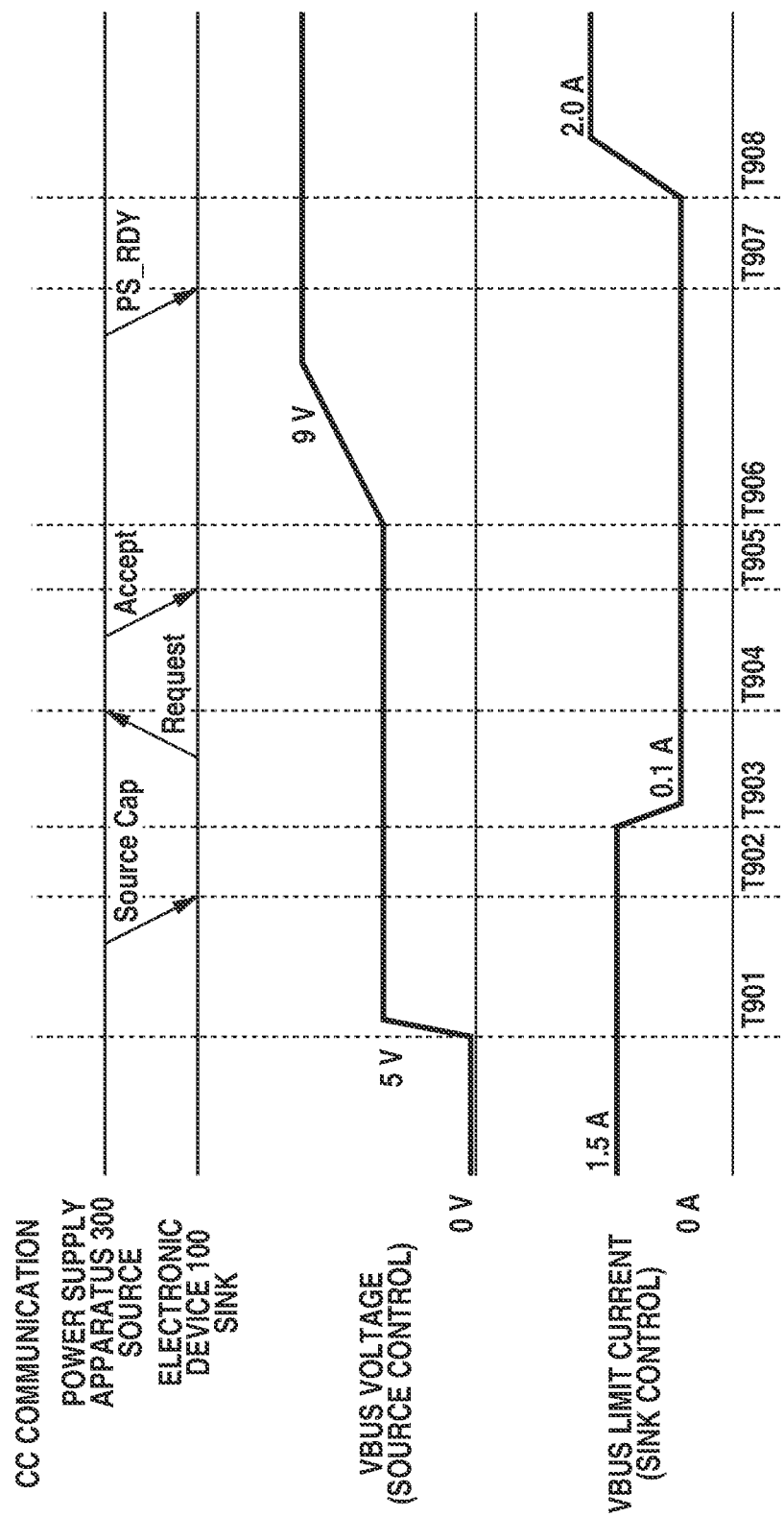
FIG. 11 is a timing chart illustrating processing performed by an electronic device.

FIG. 11 is a timing chart illustrating processing performed when the electronic device 100 is connected to the power supply apparatus 300 via the USB Type-C cable 200.

FIG. 11 illustrates, from the top downward, a communication signal from the connected device information acquisition unit 303 included in the power supply apparatus 300, and a communication signal of the connected device information acquisition unit 1091 included in the electronic device 100. FIG. 11 also illustrates the level of the VBUS voltage to be supplied from the power control unit 305 included in the power supply apparatus 300 to the connection unit 110 via the USB Type-C cable 200. FIG. 11 further illustrates the value of the VBUS current (VBUS limit current) to be limited by the power supply control unit 1093.

At a timing T901, the user connects the power supply apparatus 300 to the electronic device 100 via the USB Type-C cable 200. From the standpoint of the electronic device 100, connection of the power supply apparatus 300 is recognized by application of the VBUS voltage.

At a timing T902, the connected device information acquisition unit 1091 receives a power list (Source Capabilities) from the connected device information acquisition unit 303.

At a timing T903, the power supply control unit 1093 decreases the VBUS limit current to 0.1 A.

At a timing T904, the connected device information acquisition unit 1091 transmits Request to the connected device information acquisition unit 303.

At a timing T905, the connected device information acquisition unit 1091 receives Accept from the connected device information acquisition unit 303.

At a timing T906, the VBUS voltage output from the power supply apparatus 300 is changed from 5 V to 9 V.

At a timing T907, the connected device information acquisition unit 1091 receives PS_RDY from the connected device information acquisition unit 303.

At a timing T908, the power supply control unit 1093 increases the VBUS limit current to 2 A.

As described above, the first embodiment suitably limits the VBUS current at the timing when the power supply apparatus 300 changes the VBUS voltage, making it possible to implement control conforming to the USB PD standard.

A second embodiment described below will discuss an example where the connected device information acquisition unit 1091 independently operates before the sub control unit 108 operates.

In a case where the electronic device 100 is connected with the power supply apparatus 300 in a state where the sub control unit 108 is not activated, the communication between the connected device information acquisition unit 1091 and the sub control unit 108 may not be established as an initial operation. As a result, during control which is conducted when the electronic device 100 is connected with the power supply apparatus 300, the power received from the power supply apparatus 300 may not be decreased to predetermined power (2.5 W) or less within the predetermined time period (15 ms) specified in the USB PD standard.

Figure 7:
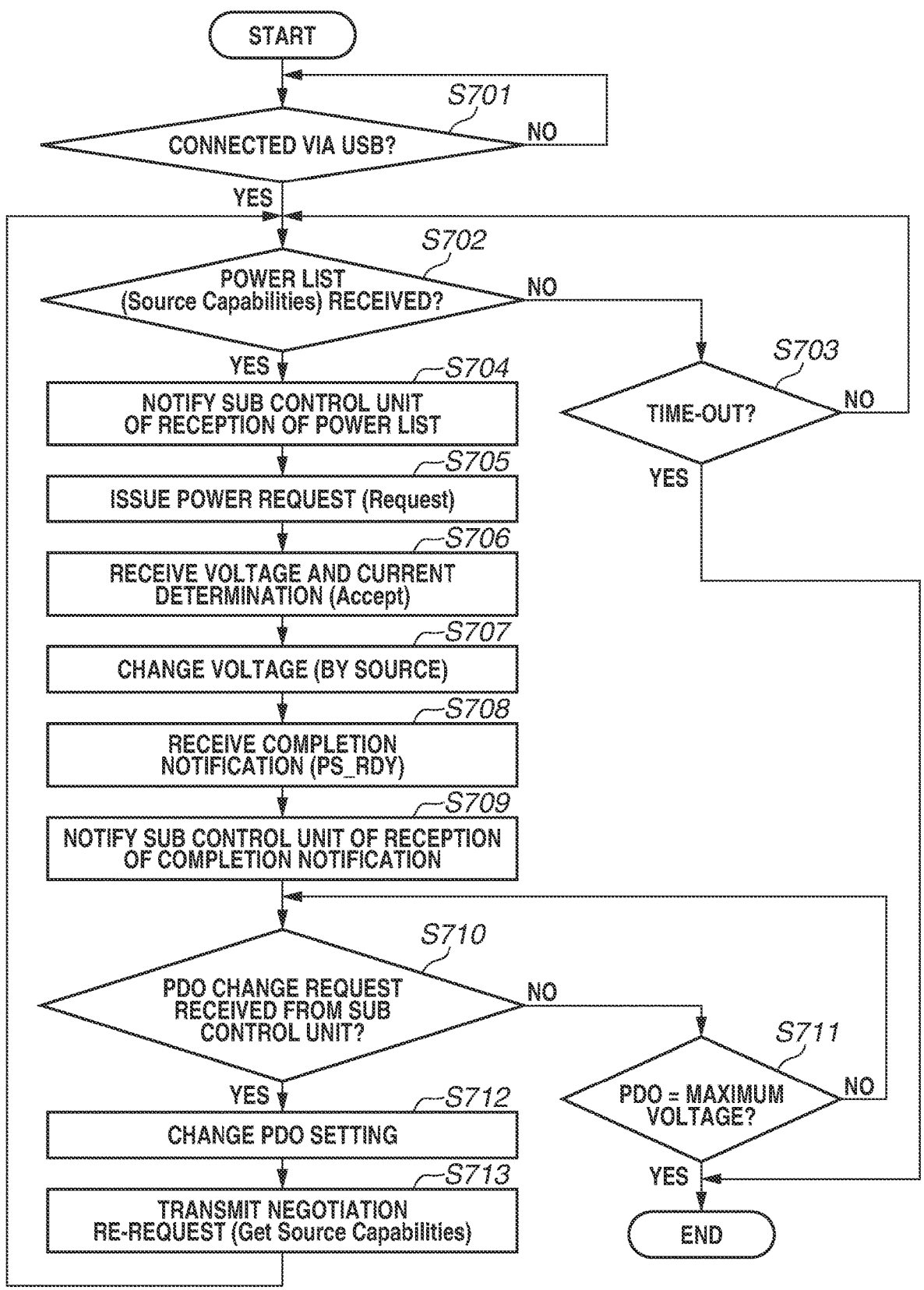
FIG. 7 is a flowchart illustrating processing performed by an electronic device.

A process performed when the electronic device 100 is connected with the power supply apparatus 300 will be described below with reference to the flowchart illustrated in FIG. 7.

In step S701, the electronic device 100 detects that the power supply apparatus 300 is connected to the connection unit 110. The electronic device 100 can detect the connection based on the VBUS voltage detected via the voltage monitoring unit 1096 or on the voltage level of the CC terminal detected via the connected device information acquisition unit 1091. The processing does not proceed to the subsequent step until the connection is detected.

In step S702, the connected device information acquisition unit 1091 waits for the reception of a power list (Source Capabilities) from the connected device information acquisition unit 303.

In step S703, the connected device information acquisition unit 1091 waits for the reception of a power list (Source Capabilities) until a time-out occurs. According to the second embodiment, for example, in a case where the electronic device 100 does not receive a power list after waiting for 620 ms, the electronic device 100 transmits a reset signal to the connected device information acquisition unit 303 via the connected device information acquisition unit 1091. If the electronic device 100 does not receive a power list after repeating the above-described sequence three times, a time-out occurs. Upon the time-out, the process for connection is terminated.

In a case where the connected device information acquisition unit 1091 receives a power list (Source Capabilities) (YES in step S702), the processing proceeds to step S704. Since the power control unit 305 is capable of supplying 5 V or 9 V, the second embodiment premises that two different power lists (5 V/3 A and 9 V/2 A) are presented. Any one of 5 V, 9 V, 15 V, or 20 V is presented as a list depending on the power supply capability of the power supply apparatus 300.

In step S704, the connected device information acquisition unit 1091 notifies the sub control unit 108 of the reception of a power list (Source Capabilities).

In step S705, the connected device information acquisition unit 1091 issues a power request (Request) to the connected device information acquisition unit 303. The electronic device 100 serving as a sink apparatus requests the power supply apparatus 300 serving as a source apparatus for Power Data Object (PDO) as a power list.

According to the second embodiment, in a case where the electronic device 100 can receive 5 V/3 A or 9 V/2 A from the power supply apparatus 300, the electronic device 100 is operable on the power received from the power supply apparatus 300 alone. PDO initial setting of the connected device information acquisition unit 1091 is set such that only 5 V/1.5 A is requested. If the power supply apparatus 300 can supply power based on the PDO received by the connected device information acquisition unit 303, the power supply apparatus 300 transmits a voltage and current determination (Accept) to the electronic device 100.

In step S706, the connected device information acquisition unit 1091 receives the voltage and current determination (Accept) from the connected device information acquisition unit 303.

In step S707, under the instruction of the control unit 301, the power supply apparatus 300 controls the power control unit 305 to change the output voltage of the power supply apparatus to the voltage indicated by the voltage and current determination (Accept). When the voltage change by the power control unit 305 is completed in step S707, the power supply apparatus 300 transmits a completion notification (PS_RDY) via the connected device information acquisition unit 303.

In step S708, the connected device information acquisition unit 1091 receives a completion notification (PS_RDY) from the connected device information acquisition unit 303.

In step S709, the connected device information acquisition unit 1091 notifies the sub control unit 108 of the reception of a completion notification (PS_RDY).

In step S710, the connected device information acquisition unit 1091 waits for a PDO change request from the sub control unit 108.

In a case where the connected device information acquisition unit 1091 does not receive a PDO change request from the sub control unit 108 (NO in step S710), the processing proceeds to step S711. If the PDO is the maximum voltage receivable by the electronic device 100 (YES in step S711), the connected device information acquisition unit 1091 ends the connection operation conforming to the USB PD standard. In a case where the PDO is only 5 V (NO in step S711), the processing returns to step S710. In step S710, the connected device information acquisition unit 1091 waits for a PDO change request from the sub control unit 108. According to the second embodiment, when the PDO is only 5 V/1.5 A (NO in step S711), the connected device information acquisition unit 1091 waits for a PDO change request. When the PDO is 5 V/3 A or 9 V/2 A (YES in step S711), the processing exits the flowchart. When the connected device information acquisition unit 1091 receives a PDO change request from the sub control unit 108 (YES in step S710), the processing proceeds to step S712. In step S712, the connected device information acquisition unit 1091 changes the PDO internal setting based on the PDO change request received from the sub control unit 108.

In step S713, the connected device information acquisition unit 1091 transmits a negotiation re-request (Get Source Capabilities) to the connected device information acquisition unit 303. Then, the processing returns to step S702. In step S702, the connected device information acquisition unit 1091 waits for the reception of a power list (Source Capabilities).

Figure 8:
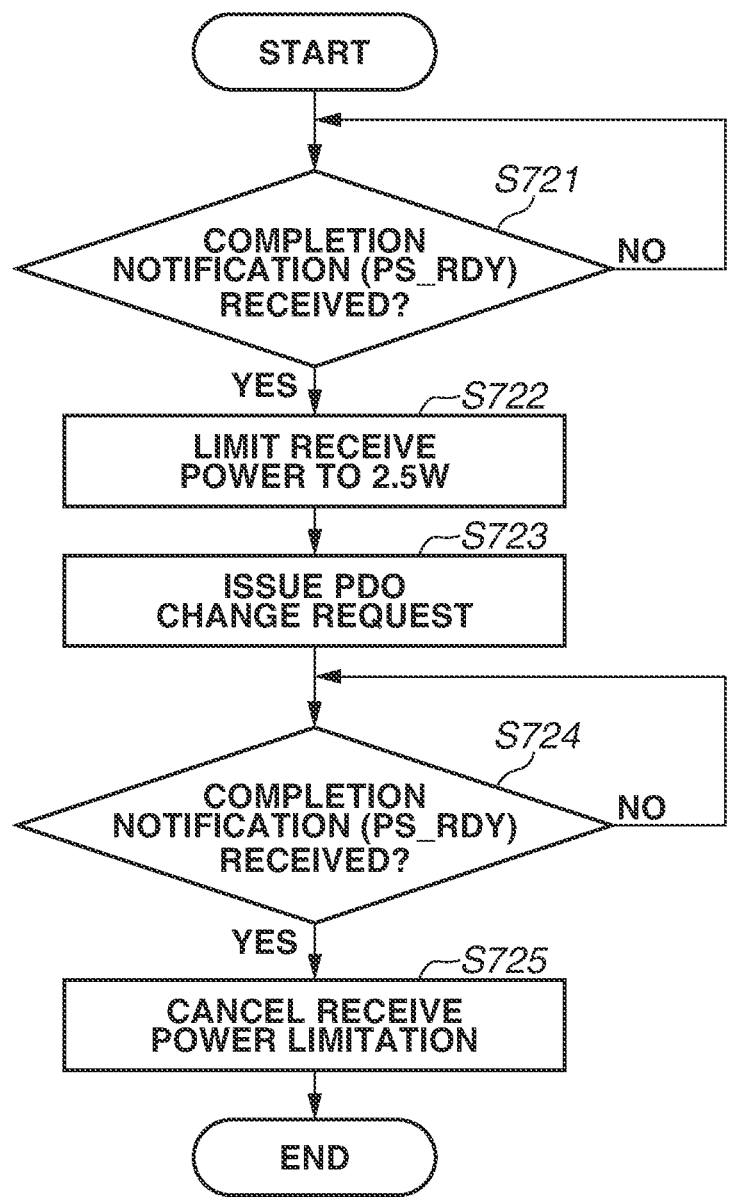
FIG. 8 is a flowchart illustrating processing performed by an electronic device.

Processing performed when the electronic device 100 is connected to the power supply apparatus 300 via the USB Type-C cable 200 will be described below with reference to the flowchart illustrated in FIG. 8. The processing illustrated in FIG. 8 is implemented when the sub control unit 108 of the electronic device 100 controls the connected device information acquisition unit 303 or the power supply control unit 1093 based on a program.

When the sub control unit 108 is activated, then in step S721, the sub control unit 108 waits for a reception notification for the completion notification (PS_RDY) from the connected device information acquisition unit 1091.

When the sub control unit 108 receives a reception notification for the completion notification (PS_RDY) (YES in step S721), the processing proceeds to step S722. In step S722, the sub control unit 108 instructs the power supply control unit 1093 to limit the VBUS current.

According to the second embodiment, since a voltage change to 9 V is assumed, the VBUS limit current needs to be set to approximately 0.277 A or less to provide predetermined power (2.5 W) or less with the 9 V voltage. According to the second embodiment, the VBUS limit current is to be set to 0.1 A or less. As described above, the current value to be limited based on the required voltage is determined by the predetermined power (2.5 W) divided by the required voltage and set to the calculated value or less.

In step S723, the sub control unit 108 instructs the connected device information acquisition unit 1091 to issue a PDO change request. The PDO change request intends to change the original 5 V voltage to a voltage of 5 V or higher.

According to the second embodiment, the sub control unit 108 instructs the connected device information acquisition unit 1091 to update the preset 5 V/1.5 A setting to a 5 V/3 A or 9 V/2 A setting.

In step S724, the sub control unit 108 waits for a reception notification for the completion notification (PS_RDY) from the connected device information acquisition unit 1091.

When the sub control unit 108 receives a reception notification for the completion notification (PS_RDY) (YES in step S724), the processing proceeds to step S725. In step S725, the sub control unit 108 instructs the power supply control unit 1093 to change the VBUS current limitation based on the PDO under the voltage and current determination (Accept).

According to the second embodiment, the sub control unit 108 instructs the power supply control unit 1093 to change the VBUS current limitation to 3 A (when connected with 5 V) or to 2 A (when connected with 9 V).

When the processing illustrated in FIG. 8 is completed, the sub control unit 108 ends the connection operation conforming to the USB PD standard.

Figure 12:
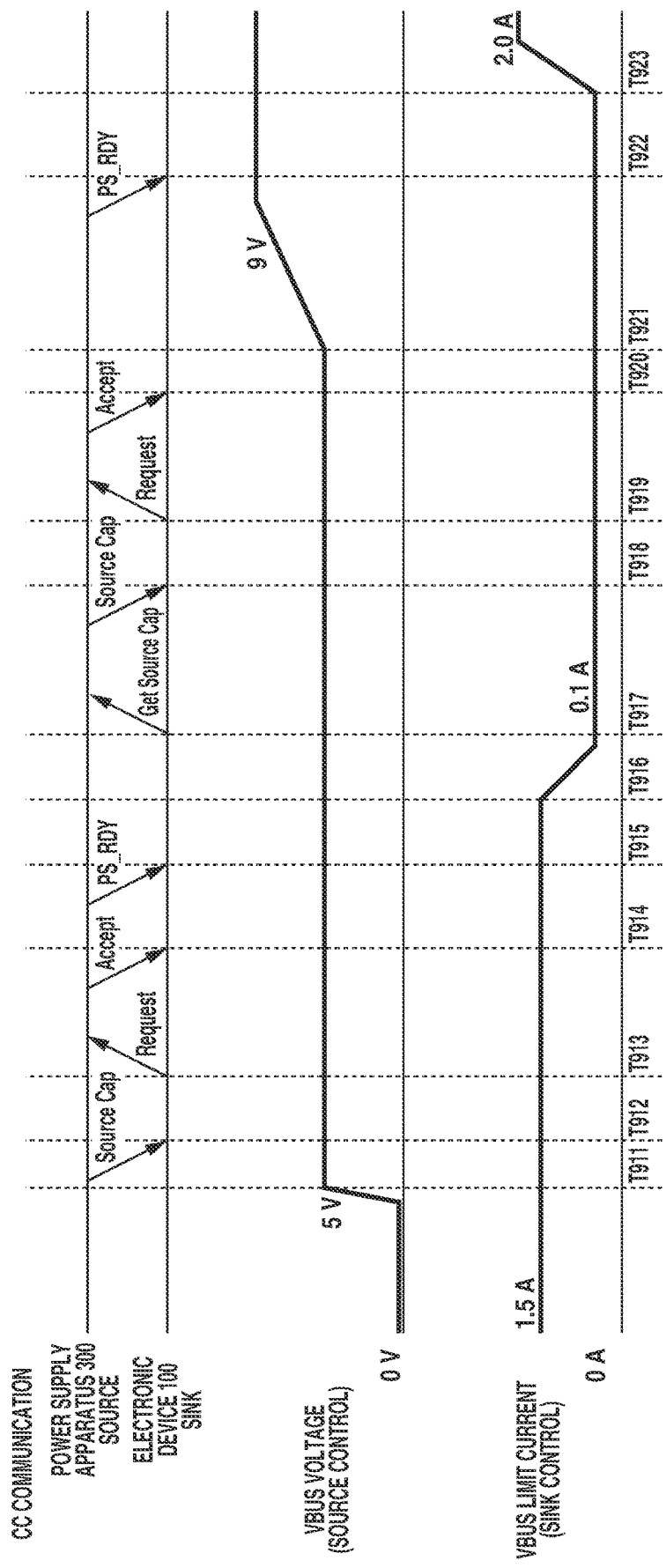
FIG. 12 is a timing chart illustrating processing performed by an electronic device.

FIG. 12 is a timing chart illustrating processing performed when the electronic device 100 is connected to the power supply apparatus 300 via the USB Type-C cable 200.

FIG. 12 illustrates, from the top downward, a communication signal from the connected device information acquisition unit 303 included in the power supply apparatus 300, and a communication signal of the connected device information acquisition unit 1091 included in the electronic device 100. FIG. 12 also illustrates the level of the VBUS voltage to be supplied from the power control unit 305 included in the power supply apparatus 300 to the connection unit 110 via the USB Type-C cable 200. FIG. 12 further illustrates the value of the VBUS current (VBUS limit current) to be limited by the power supply control unit 1093.

At a timing T911, the user connects the power supply apparatus 300 to the electronic device 100 via the USB Type-C cable 200. From the standpoint of the electronic device 100, connection of the power supply apparatus 300 is recognized by application of the VBUS voltage.

At a timing T912, the connected device information acquisition unit 1091 receives a power list (Source Capabilities) from the connected device information acquisition unit 303.

At a timing T913, the connected device information acquisition unit 1091 transmits Request to the connected device information acquisition unit 303.

At a timing T914, the connected device information acquisition unit 1091 receives Accept from the connected device information acquisition unit 303. Since the initial setting of the PDO of the connected device information acquisition unit 1091 is 5 V/1.5 A, the VBUS voltage remains unchanged.

At a timing T915, the connected device information acquisition unit 1091 receives PS_RDY from the connected device information acquisition unit 303.

At a timing T916, the power supply control unit 1093 decreases the VBUS limit current to 0.1 A.

At a timing T917, the connected device information acquisition unit 1091 updates the PDO and transmits a power list (Source Capabilities) to the connected device information acquisition unit 303.

At a timing T918, the connected device information acquisition unit 1091 receives a power list (Source Capabilities) again from the connected device information acquisition unit 303.

At a timing T919, the connected device information acquisition unit 1091 transmits Request to the connected device information acquisition unit 303. In this case, since the PDO setting has been updated to 5 V/3 A or 9 V/2 A, 9 V is required.

At a timing T920, the connected device information acquisition unit 1091 receives Accept from the connected device information acquisition unit 303.

At a timing T921, the VBUS voltage output from the power supply apparatus 300 is changed from 5 V to 9 V.

At a timing T922, the connected device information acquisition unit 1091 receives PS_RDY from the connected device information acquisition unit 303.

At a timing T923, the power supply control unit 1093 increases the VBUS limit current to 2 A.

As described above, the second embodiment suitably limits the VBUS current at the timing when the power supply apparatus 300 changes the VBUS voltage, making it possible to implement control conforming to the USB PD standard.

A third embodiment described below will discuss an example where the connected device information acquisition unit 1091 can independently operate before the sub control unit 108 operates.

In a case where the electronic device 100 is connected with the power supply apparatus 300 in a state where the sub control unit 108 is not activated, the communication between the connected device information acquisition unit 1091 and the sub control unit 108 may not be established as an initial operation. As a result, during control which is conducted when the electronic device 100 is connected with the power supply apparatus 300, the power received from the power supply apparatus 300 may not be decreased to predetermined power (2.5 W) or less within the predetermined time period (15 ms) specified in the USB PD standard.

The USB connection needs to be established as soon as possible in a state where the sub control unit 108 is activated.

Figure 9:
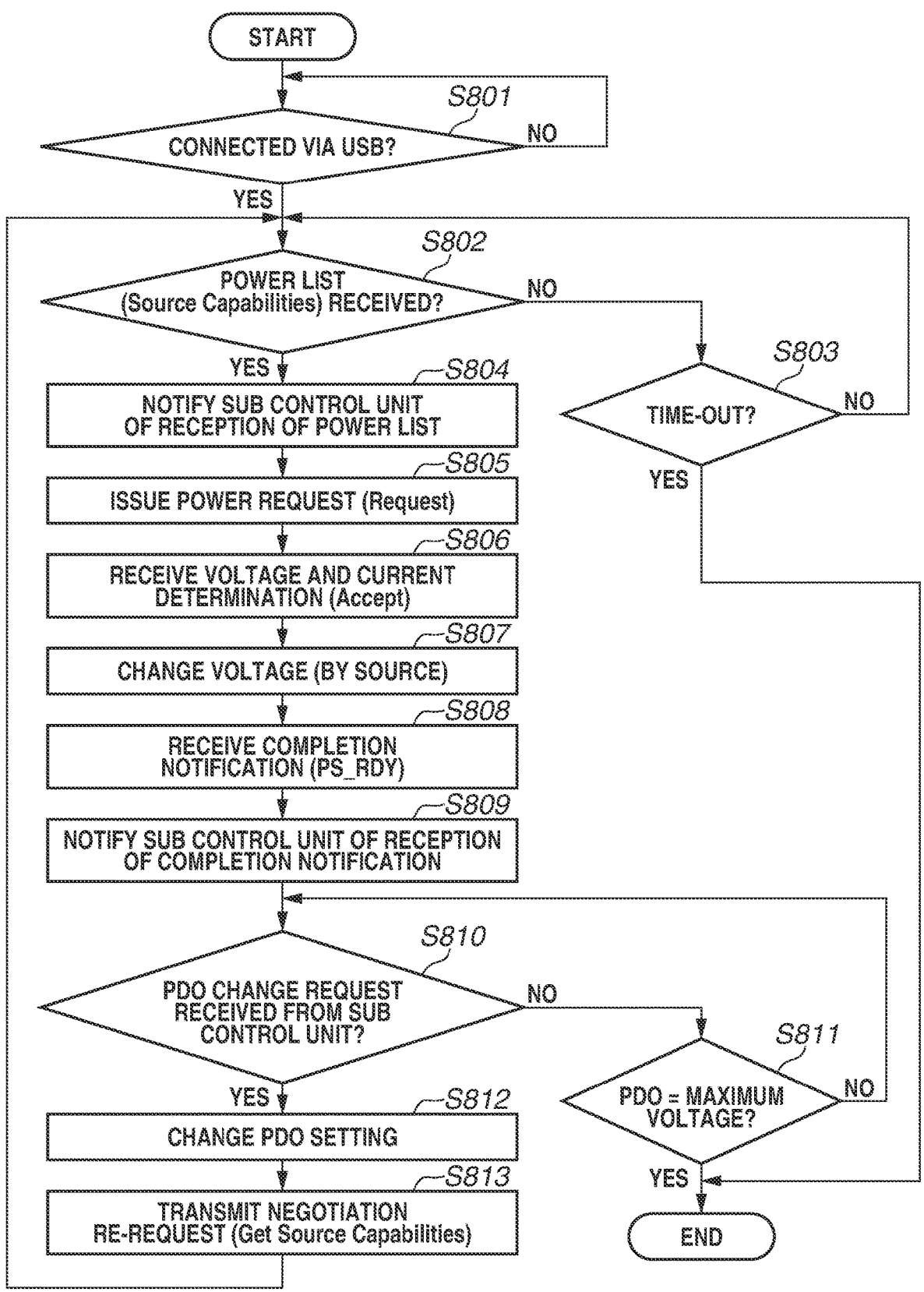
FIG. 9 is a flowchart illustrating processing performed by an electronic device.

Processing performed when the electronic device 100 is connected to the power supply apparatus 300 will be described below with reference to the flowchart illustrated in FIG. 9.

In step S801, the electronic device 100 detects that the power supply apparatus 300 is connected to the connection unit 110. The electronic device 100 can detect the connection based on the VBUS voltage detected via the voltage monitoring unit 1096 or on the voltage level of the CC terminal detected via the connected device information acquisition unit 1091. The processing does not proceed to the following step until the connection is detected.

In step S802, the connected device information acquisition unit 1091 waits for the reception of a power list (Source Capabilities) from the connected device information acquisition unit 303.

In step S803, the connected device information acquisition unit 1091 waits for the reception of a power list (Source Capabilities) until a time-out occurs. According to the third embodiment, for example, if the electronic device 100 does not receive a power list after waiting for 620 ms, the electronic device 100 transmits a reset signal to the connected device information acquisition unit 303 via the connected device information acquisition unit 1091. If the electronic device 100 does not receive a power list after repeating the above-described sequence three times, a time-out occurs. Upon the time-out, the process for connection is terminated.

In a case where the connected device information acquisition unit 1091 receives a power list (Source Capabilities) (YES in step S802), the processing proceeds to step S804. Since the power control unit 305 is capable of supplying 5 V or 9 V, the third embodiment premises that two different power lists (5 V/3 A and 9 V/2 A) are presented. Any one of 5 V, 9 V, 15 V, or 20 V is presented as a list depending on the power supply capability of the power supply apparatus 300.

In step S804, the connected device information acquisition unit 1091 notifies the sub control unit 108 of the reception of a power list (Source Capabilities).

In step S805, the connected device information acquisition unit 1091 issues a power request (Request) to the connected device information acquisition unit 303. The electronic device 100 serving as a sink apparatus requests the power supply apparatus 300 serving as a source apparatus for Power Data Object (PDO) as a power list.

According to the third embodiment, in a case where the electronic device 100 can receive 5 V/3 A or 9 V/2 A from the power supply apparatus 300, the electronic device 100 is operable on the power received from the power supply apparatus 300 alone. PDO initial setting of the connected device information acquisition unit 1091 is set such that only 5 V/1.5 A is requested. If the power supply apparatus 300 can supply power based on the PDO received by the connected device information acquisition unit 303 (based on the determination of the control unit 301), the power supply apparatus 300 transmits a voltage and current determination (Accept) to the electronic device 100.

In step S806, the connected device information acquisition unit 1091 receives the voltage and current determination (Accept) from the connected device information acquisition unit 303.

In step S807, under the instruction of the control unit 301, the power supply apparatus 300 controls the power control unit 305 to change the output voltage of the power supply apparatus to the voltage indicated by the voltage and current determination (Accept). When the voltage change by the power control unit 305 is completed in step S807, the power supply apparatus 300 transmits a completion notification (PS_RDY) via the connected device information acquisition unit 303.

In step S808, the connected device information acquisition unit 1091 receives a completion notification (PS_RDY) from the connected device information acquisition unit 303.

In step S809, the connected device information acquisition unit 1091 notifies the sub control unit 108 of the reception of a completion notification (PS_RDY).

In step S810, the connected device information acquisition unit 1091 waits for a PDO change request from the sub control unit 108.

In a case where the connected device information acquisition unit 1091 does not receive a PDO change request from the sub control unit 108 (NO in step S810), the processing proceeds to step S811. If the PDO is the maximum voltage receivable by the electronic device 100 (YES in step S811), the connected device information acquisition unit 1091 ends the connection operation conforming to the USB PD standard. If the PDO is only 5 V (NO in step S811), the processing returns to step S810. In step S810, the connected device information acquisition unit 1091 waits for a PDO change request from the sub control unit 108.

According to the third embodiment, in a case where the PDO is only 5 V/1.5 A (NO in step S811), the connected device information acquisition unit 1091 waits for a PDO change request. In a case where the PDO is 5 V/3 A or 9 V/2 A (YES in step S811), the processing exits the flowchart. In a case where the connected device information acquisition unit 1091 receives a PDO change request from the sub control unit 108 (YES in step S810), the processing proceeds to step S812. In step S812, the connected device information acquisition unit 1091 changes the PDO internal setting based on the PDO change request received from the sub control unit 108.

In step S813, the connected device information acquisition unit 1091 transmits a negotiation re-request (Get Source Capabilities) to the connected device information acquisition unit 303. Then, the processing returns to step S802. In step S802, the connected device information acquisition unit 1091 waits for the reception of a power list (Source Capabilities).

Figure 10:
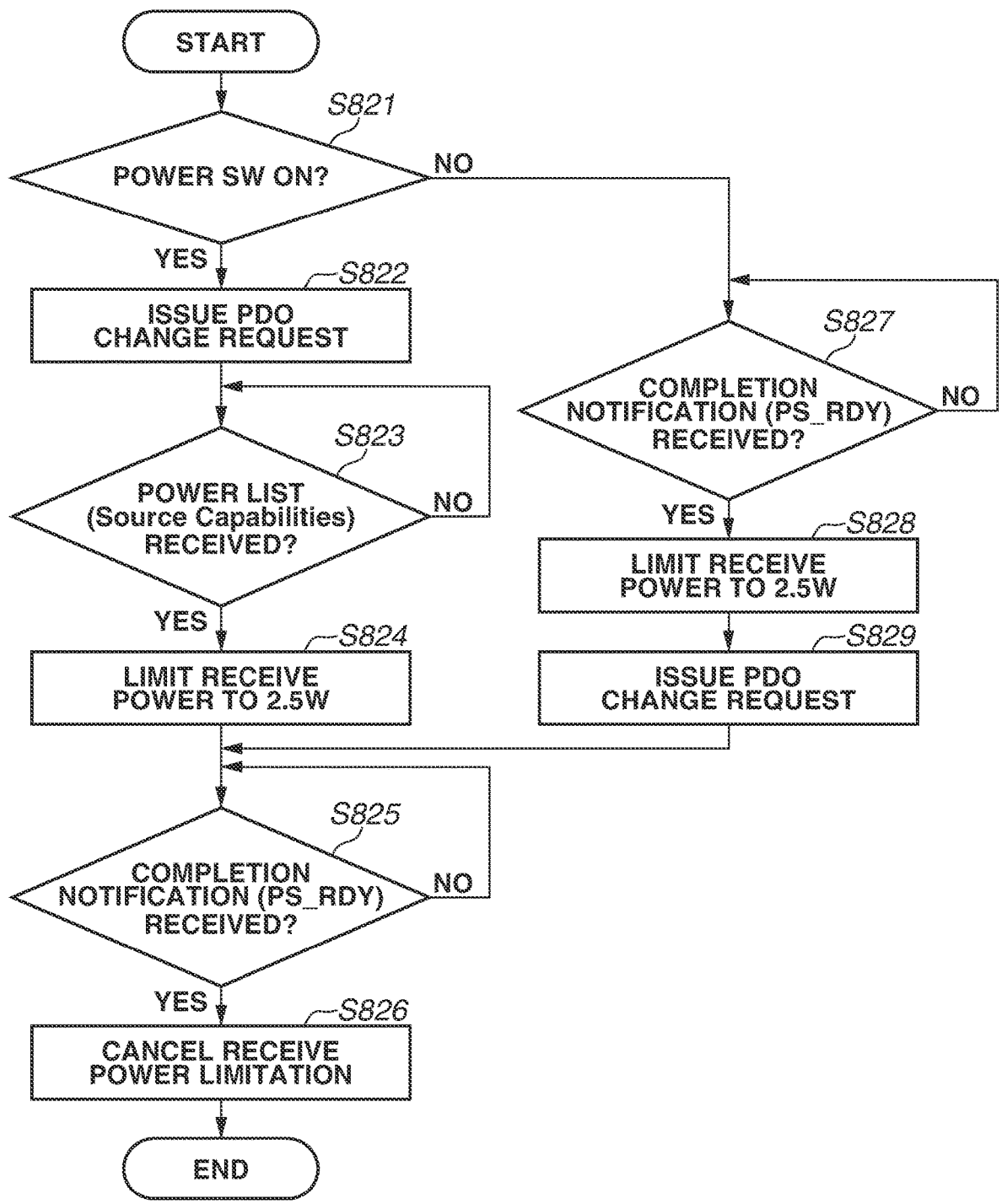
FIG. 10 is a flowchart illustrating processing performed by an electronic device.

Processing performed in a case where the electronic device 100 is connected to the power supply apparatus 300 via the USB Type-C cable 200 will be described below with reference to the flowchart illustrated in FIG. 10. The processing illustrated in FIG. 10 is implemented when the sub control unit 108 of the electronic device 100 controls the connected device information acquisition unit 303 or the power supply control unit 1093 based on a program.

In step S821, the sub control unit 108 determines whether the electronic device 100 is turned ON or OFF. Although, in the third embodiment, the sub control unit 108 determines whether the electronic device 100 is turned ON or OFF, the sub control unit 108 can use other methods. For example, the sub control unit 108 can determine whether the battery 111 is connected or confirm the batter remaining amount.

In a case where the electronic device 100 is turned ON (YES in step S821), the processing proceeds to step S822. In step S822, the sub control unit 108 issues a PDO change request to the connected device information acquisition unit 1091. The PDO change request intends to add a voltage of 5 V or higher to the original 5 V voltage. According to the third embodiment, the sub control unit 108 instructs the connected device information acquisition unit 1091 to update the preset 5 V/1.5 A setting to a 5 V/3 A or 9 V/2 A setting.

In step S823, the sub control unit 108 waits for a power list (Source Capabilities) reception notification from the connected device information acquisition unit 1091. When the sub control unit 108 receives a power list (Source Capabilities) reception notification (YES in step S823), the processing proceeds to step S824. In step S824, the sub control unit 108 instructs the power supply control unit 1093 to limit a VBUS current.

According to the third embodiment, since a voltage change to 9 V is assumed, the VBUS limit current needs to be set to approximately 0.277 A or less to provide predetermined power (2.5 W) or less with the 9 V voltage. According to the third embodiment, the VBUS limit current is to be set to 0.1 A or less. As described above, the current value to be limited based on the required voltage is determined by the predetermined power (2.5 W) divided by the required voltage and set to the calculated value or less.

According to the third embodiment, the sub control unit 108 limits the VBUS current upon reception of a power list (Source Capabilities) reception notification. As a result of the reception of a power list, if the VBUS voltage is not to be changed, such as in a case where the power supply apparatus 300 can output only 5 V, the sub control unit 108 does not necessarily need to limit the VBUS current.

In a case where the electronic device 100 is turned OFF (NO in step S821), the processing proceeds to step S827. In step S827, the sub control unit 108 waits for a reception notification for the completion notification (PS_RDY) from the connected device information acquisition unit 1091.

When the sub control unit 108 receives a reception notification for the completion notification (PS_RDY) (YES in step S827), the processing proceeds to step S828. In step S828, the sub control unit 108 instructs the power supply control unit 1093 to limit the VBUS current.

According to the third embodiment, since a voltage change to 9 V is assumed, the VBUS limit current needs to be set to approximately 0.277 A or less to provide predetermined power (2.5 W) or less with the 9 V voltage. According to the third embodiment, the VBUS limit current is to be set to 0.1 A or less. As described above, the current value to be limited based on the required voltage is determined by the predetermined power (2.5 W) divided by the required voltage and set to the calculated value or less.

In step S829, the sub control unit 108 issues a PDO change request to the connected device information acquisition unit 1091. The PDO change request intends to change the original 5 V voltage to a voltage of 5 V or higher.

According to the third embodiment, the sub control unit 108 instructs the connected device information acquisition unit 1091 to update the preset 5 V/1.5 A to a 5 V/3 A or 9 V/2 A setting.

In step S825, the sub control unit 108 waits for a reception notification for the completion notification (PS_RDY) from the connected device information acquisition unit 1091.

When the sub control unit 108 receives a reception notification for the completion notification (PS_RDY) (YES in step S825), the processing proceeds to step S826. In step S826, the sub control unit 108 instructs the power supply control unit 1093 to change the VBUS current limitation based on the PDO under the voltage and current determination (Accept).

According to the third embodiment, the sub control unit 108 instructs the power supply control unit 1093 to change the VBUS current limitation to 3 A (when connected with 5 V) or to 2 A (when connected with 9 V).

When the processing illustrated in FIG. 10 is completed, the sub control unit 108 ends the connection operation conforming to the USB PD standard.

As described above, in a case where the electronic device 100 is already activated when the power supply apparatus 300 is connected to the electronic device 100, the electronic device 100 operates based on the timing chart illustrated in FIG. 11. If the electronic device 100 is not activated when the power supply apparatus 300 is connected to the electronic device 100, the electronic device 100 operates based on the timing chart illustrated in FIG. 12.

As described above, the third embodiment suitably limits the VBUS current at the timing when the power supply apparatus 300 changes the VBUS voltage, making it possible to implement control conforming to the USB PD standard.

Various functions, processes, or methods according to the first, second, and third embodiments can be implemented by a personal computer, a microcomputer, a CPU, a microprocessor, etc. via a program. A personal computer, a microcomputer, a CPU, or a microprocessor can be collectively referred to as a "computer X". The program for controlling the computer X and implementing various functions, processes, or methods can be referred to as a "program Y".

Various functions, processes, or methods according to the first, second, and third embodiments are implemented when the computer X executes the program Y. The program Y is supplied to the computer X via a non-transitory computer-readable storage medium. The non-transitory computer-readable storage medium includes at least a hard disk drive, a magnetic storage device, an optical storage device, a magneto-optical storage device, a memory card, a volatile memory, or a nonvolatile memory.

While aspects of the disclosure are described with reference to exemplary embodiments, these aspects are not limited to the exemplary embodiments. The scope of the following claims is to be accorded the broadest interpretation so as to encompass all modifications and equivalent structures.

This application claims the benefit of Japanese Patent Application No. 2019-141731, filed Jul. 31, 2019, which is hereby incorporated by reference herein in its entirety.

What is claimed is:

1. An electronic device comprising:
a connector;
a central processing unit (CPU); and
a memory that stores a program which, when executed by the CPU, causes the electronic device to function as:
a power receiving unit that receives power from a power supply apparatus connected to the connector via a first terminal;
a power control unit that controls the power receiving unit; and
a communication control unit that communicates with the power supply apparatus connected to the connector via a second terminal,
wherein the communication control unit receives a power list about power supply capability of the power supply apparatus from the power supply apparatus connected to the connector and notifies the power control unit of the reception of the power list in accordance with the reception of the power list from the power supply apparatus,
wherein the communication control unit transmits a power request for requesting of power to the power supply apparatus via the second terminal in accordance with the power list received from the power supply apparatus,
wherein the power control unit performs a process for limiting current received by the power receiving unit to a predetermined value or less so as to limit power received from the power supply apparatus to a predetermined power lower than the requested power or less, in accordance with the notification of the reception of the power list from the communication control unit,
wherein the power receiving unit receives the predetermined power or less from the power supply apparatus via the first terminal in a case where the process for limiting the current is performed,
wherein the communication control unit receives, from the power supply apparatus, a completion notification that a voltage change to a requested voltage in the power request by the power supply apparatus is completed and notifies the power control unit of the reception of the completion notification in accordance with the reception of the completion notification from the power supply apparatus,
wherein the power control unit performs a process for cancelling the limiting of the current received by the power receiving unit in accordance with the notification of the reception of the completion notification from the communication control unit, and
wherein the power receiving unit receives the requested power higher than the predetermined power from the power supply apparatus via the first terminal in a case where the process for cancelling the limiting of the current is performed.

2. The electronic device according to claim 1, wherein the predetermined value is determined based on the requested voltage.

3. The electronic device according to claim 1, wherein the current received by the power receiving unit is set based on athe requested voltage in a case where the process for cancelling the limiting of the current is performed.

4. The electronic device according to claim 1, wherein the predetermined power is 2.5 W.

5. The electronic device according to claim 1, wherein the first terminal is a VBUS terminal, and the second terminal is a CC (configuration channel) terminal.

6. A method for controlling a power receiving device comprising:
receiving power from a power supply apparatus via a first terminal of the power receiving device;
receiving a power list about power supply capability of the power supply apparatus from the power supply apparatus via a second terminal of the power receiving device;
transmitting a power request or requesting of power to the power supply apparatus via the second terminal in accordance with the power list received from the power supply apparatus; and
performing a process for limiting current received by the receiving power to a predetermined value or less so as to limit power received from the power supply apparatus to a predetermined power lower than the requested power or less, in accordance with a notification of the reception of the power list from the receiving the power list,
wherein the receiving power receives the predetermined power or less from the power supply apparatus in a case where the process for limiting the current is performed;
receiving, from the power supply apparatus, a completion notification that a voltage change to a requested voltage in the power request by the power supply apparatus is completed; and
performing a process for cancelling the limiting of the current received from the power supply apparatus in accordance with a notification of reception of the completion notification from the receiving the completion notification, wherein the receiving power receives the requested power higher than the predetermined power in a case where the process for cancelling the limiting of the current is performed.

7. The method according to claim 6, wherein the predetermined current is determined based on the requested voltage.

8. The method according to claim 6, wherein the current received from the power supply apparatus via the first terminal is set based on the requested voltage in a case where the process for limiting power is performed.

9. The method according to claim 6, wherein the predetermined power is 2.5 W.

10. The method according to claim 6, wherein the first terminal is a VBUS terminal, and the second terminal is a CC (configuration channel) terminal.

11. A non-transitory storage medium that stores a program causing a computer to execute a method for controlling a power receiving device, the method comprising:
- receiving power from a power supply apparatus via a first terminal of the power receiving device;
- receiving a power list about power supply capability of the power supply apparatus from the power supply apparatus via a second terminal of the power receiving device;
- transmitting a power request or requesting power to the power supply apparatus via the second terminal in accordance with the power list received from the power supply apparatus;
- performing a process for limiting current received by the receiving power to a predetermined value or less so as to limit power received from the power supply apparatus to a predetermined power lower than the requested power or less, in accordance with a notification of the reception of the power list from the receiving the power list,
- wherein the receiving power receives the predetermined power or less from the power supply apparatus in a case where the process for limiting the current is performed;
- receiving, from the power supply apparatus, completion notification that a voltage change to a requested voltage in the power request by the power supply apparatus is completed; and
- performing a process for cancelling the limiting of the current received from the power supply apparatus, in accordance with a notification of reception of the completion notification from the receiving the completion notification,
- wherein the receiving power receives the requested power higher than the predetermined power in a case where the process for cancelling the limiting of the current is performed.

12. The electronic apparatus according to claim 1, wherein the power control unit keeps the current received by the power receiving unit to the predetermined value or less until the notification of the reception of the completion notification from the communication control unit in the process for limiting the current.

13. The electronic apparatus according to claim 1, wherein the power supply apparatus changes voltage supplied to the power receiving unit to the requested voltage in accordance with the power request from the communication control unit, and transmits the completion notification to the communication control unit in a case that the voltage supplied to the power receiving unit has changed to the requested voltage.

14. The method according to claim 6, wherein in the process for limiting, the current received by the receiving power is kept to the predetermined value or less until the notification of the reception of the completion notification from the receiving the completion notification.

15. The method according to claim 6, wherein the power supply apparatus changes a voltage supplied to the first terminal to the requested voltage in accordance with the power request transmitted by the transmitting and transmits the completion notification to the power receiving device in a case that the voltage supplied to the power receiving device has changed to the requested voltage.

* * * * *